United States Patent
Oda et al.

(10) Patent No.: US 9,895,801 B2
(45) Date of Patent: Feb. 20, 2018

(54) OFFLINE TEACHING DEVICE USING SIMULATION

(71) Applicant: FANUC Corporation, Yamanashi (JP)

(72) Inventors: Masaru Oda, Yamanashi (JP); Yoshiharu Nagatsuka, Yamanashi (JP); Kozo Inoue, Yamanishi (JP)

(73) Assignee: FANUC CORPORATION, Yamanashi (JP)

( * ) Notice: Subject to any disclaimer, the term of this patent is extended or adjusted under 35 U.S.C. 154(b) by 39 days.

(21) Appl. No.: 14/734,297

(22) Filed: Jun. 9, 2015

(65) Prior Publication Data

US 2015/0375393 A1 Dec. 31, 2015

(30) Foreign Application Priority Data

Jun. 25, 2014 (JP) .................................. 2014-130589

(51) Int. Cl.
B25J 9/16 (2006.01)

(52) U.S. Cl.
CPC ... B25J 9/1664 (2013.01); *G05B 2219/39132* (2013.01); *G05B 2219/40042* (2013.01); *G05B 2219/40417* (2013.01); *G05B 2219/40519* (2013.01); *Y02P 90/265* (2015.11)

(58) Field of Classification Search
CPC ...................................................... B25J 9/1671
USPC .......................................................... 700/259
See application file for complete search history.

(56) References Cited

U.S. PATENT DOCUMENTS

| 4,659,902 A * | 4/1987 | Swensrud .......... B23K 26/0823 219/121.74 |
| 2004/0138779 A1* | 7/2004 | Shibata .................... B23K 11/11 700/245 |
| 2011/0301733 A1 | 12/2011 | Yoshima et al. |

FOREIGN PATENT DOCUMENTS

| CN | 102375450 A | 3/2012 |
| CN | 102785046 A | 11/2012 |
| DE | 69216167 T2 | 7/1997 |
| DE | 112013003209 T5 | 4/2015 |
| JP | 2868343 B2 | 3/1999 |
| JP | 2004-9172 A | 1/2004 |
| JP | 2005-52941 A | 3/2005 |
| JP | 2006-99474 A | 4/2006 |
| JP | 2006-297490 A | 11/2006 |

(Continued)

OTHER PUBLICATIONS

CN103645725A, Cheng, published on Mar. 19, 2014, p. 1-6.*
DE102008033797A1, Dieter, published Jan. 21, 2010, p. 1-9.*

*Primary Examiner* — Sean Shechtman
(74) *Attorney, Agent, or Firm* — Hauptman Ham, LLP (57) ABSTRACT

An offline teaching device has a calculation unit which calculates a second position of a second tool on a work line which is separated by a predetermined distance from a first position of a first tool on the work line, calculates a workpiece position where the first tool in the first position contacts or adjoins the workpiece, and calculates a workpiece position and posture such that the second tool in the second position contacts or adjoins the workpiece by changing the posture of the workpiece from the workpiece position with respect to the first tool, while maintaining the work posture of the first tool, and has a generation unit which generates a robot teaching position based on the position and posture of the workpiece and the holding position of the (Continued)

workpiece, and generates a program such that the first tool and the second tool pass along the work line.

6 Claims, 9 Drawing Sheets

(56) References Cited

FOREIGN PATENT DOCUMENTS

| | | |
|---|---|---|
| JP | 4621641 B2 | 1/2011 |
| JP | 2011-230257 A | 11/2011 |
| JP | 2014-18878 A | 2/2014 |

* cited by examiner

OFFLINE TEACHING DEVICE USING SIMULATION

RELATED APPLICATIONS

The present application claims priority to Japanese Application Number 2014-130589, filed Jun. 25, 2014, the disclosure of which is hereby incorporated by reference herein in its entirety.

BACKGROUND ART

1. Technical Field

The present invention relates to an offline teaching device which teaches a robot position etc. using a simulation.

2. Description of the Related Art

Articulated robots are widely used on production lines etc. Before using these articulated robots, it is necessary to perform teaching operations on the articulated robots. Performing teaching operations by actually manipulating the articulated robot is inefficient so recently offline teaching operations are common.

Japanese Patent number 4621641 discloses a teaching method in which several pieces of tip information of a robot are set based on the CAD workpiece information, and based on the tip information thus set, the posture of the robot is calculated according to an inverse conversion operation. Further, Japanese Patent number 2868343 discloses an offline teaching method which performs teaching automatically and can improve processing quality when processing an uneven surface of a three dimensional workpiece.

Herein, a laser cutting operation using an articulated robot will be considered. In a laser cutting operation, directly after cutting a workpiece with a laser, the cut portion of the workpiece is cooled by cold water and accordingly the processing quality is improved. Further, by setting the time taken between cutting the workpiece and cooling the workpiece to a constant value, the processing quality can be maintained at a fixed level.

To improve the processing quality or maintain the processing quality at a fixed level in this way, it is necessary that the laser cutting tool and the cooling tool are maintained at a fixed distance and the cooling tool ejects cold water along the trajectory of the laser cutting tool. Therefore, when using an articulated robot to carry out a laser cutting operation, it is necessary to teach the robot position in which cold water is accurately ejected along the trajectory of the laser cutting tool. However, it was not possible to accurately teach such a robot position.

Moreover, if the laser cutting tool and the cooling tool are arranged to have a fixed distance therebetween, when laser machining is performed along a straight path, the time taken between cutting the workpiece and cooling the workpiece can be maintained at a fixed time. However when laser machining is performed along an arced path, the time taken from cutting the workpiece to cooling the workpiece is longer than for a straight path. Therefore, in this case, there was a problem that the processing quality decreased. Note that in machining operations other than the laser cutting operation the same problem would arise.

In view of such circumstances, it is the object of the present invention to provide an offline teaching device which can teach a robot position to accurately eject cold water along the trajectory of a laser cutting tool without the processing quality decreasing even when laser cutting is performed along an arced path.

SUMMARY OF THE INVENTION

In order to achieve the object, according to the first aspect of the present invention, an offline teaching device wherein a workpiece held by a robot is brought into contact with or is moved close to a first tool disposed at a predetermined position and a second tool separated by a predetermined distance from the first tool, to carry out work comprising: a holding position setting unit which sets the holding position of the workpiece held by the robot, a specification unit which specifies a work line on which the first tool carries out work according to CAD data of the workpiece, an installation position and posture setting unit which sets the installation position and posture of the first and second tools, a work posture setting unit which sets the work posture of the first tool with respect to the workpiece, a calculation unit which calculates a second position for the second tool on the work line, which is a position separated by the predetermined distance from a first position of the first tool on the work line, calculates a workpiece position where the first tool in the first position contacts or adjoins the workpiece, and calculates the workpiece position and posture such that the second tool in the second position contacts or adjoins the workpiece by changing the posture of the workpiece from the workpiece position with respect to the first tool, while maintaining the work posture of the first tool, and a generation unit which generates a robot teaching position based on the workpiece position and posture calculated by the calculation unit and the holding position of the workpiece set by the holding position setting unit and generates a program according to which the first tool and the second tool pass along the work line.

According to the second aspect of the present invention, there is provided an offline teaching device wherein a workpiece held by a robot is brought into contact with or is moved close to a first tool disposed at a predetermined position and a second tool which is three dimensionally moveable with respect to the first tool, to carry out work comprising: a holding position setting unit which sets the holding position of the workpiece held by the robot, a specification unit which specifies a work line on which the first tool carries out work according to CAD data of the workpiece, an installation position and posture setting unit which sets the installation position and posture of the first and second tools, a work posture setting unit which sets the work posture of the first tool with respect to the workpiece, a distance setting unit for setting the distance between the first tool and the second tool along the work line, a calculation unit which calculates a second position for the second tool on the workpiece positioned on the work line separated by the distance set by the distance setting unit from a first position on the workpiece on which the first tool will carry out work on the work line, calculates the workpiece position where the first tool which is in a work posture in the first position on the work line contacts or adjoins the workpiece, calculates the robot position based on the workpiece position and the holding position of the workpiece set by the holding position setting unit, and calculates the position of the second tool based on the workpiece position and the second position, a position teaching unit which teaches the robot position and the position of the second tool such that the first tool and the second tool pass along the work line and the distance therebetween along the work line is fixed.

According to the third aspect of the present invention, there is provided an offline teaching device comprising a robot to whose tip is affixed a first tool, and a second tool which is separated by a predetermined distance from the first tool, wherein the robot carries out work on a workpiece disposed in a predetermined position, while moving the first tool and the second tool, comprising: a specification unit which specifies a work line on which the first tool carries out work according to CAD data of the workpiece, an installation position and posture setting unit which sets the installation position and posture of the first and second tools, a work posture setting unit which sets the work posture of the first tool with respect to the workpiece, a calculation unit which calculates a second position for the second tool on the work line which is separated by the predetermined distance from a first position of the first tool on the work line, and calculates a robot position where the first tool in the first position contacts or adjoins the workpiece, and a generation unit which generates a robot position and posture as a robot teaching point when the second tool in the second position contacts or adjoins the workpiece by changing the posture of the robot from the robot position with respect to the first tool, while maintaining the work posture of the first tool, and generates a program according to which the first tool and the second tool pass along the work line.

According to the fourth aspect of the present invention, there is provided an offline teaching device comprising a robot to whose tip is affixed a first tool, and a second tool three dimensionally movable with respect to the first tool, wherein the robot carries out work on a workpiece disposed in a predetermined position while moving the first tool and the second tool, comprising: a specification unit which specifies a work line on which the first tool works according to CAD data of the workpiece, an installation position and posture setting unit which sets the installation position and posture of the first and second tools, a work posture setting unit which sets the work posture of the first tool with respect to the workpiece, a distance setting unit which sets the distance between the first tool and the second tool along the work line, a calculation unit which calculates a second position for the second tool on the workpiece, which is separated by the predetermined distance set by the distance setting unit, from a first position on the workpiece on which the first tool will carry out work on the work line, calculates a robot position where the first tool in the work posture contacts or adjoins the workpiece at a first position and calculates the position of the second tool based on the robot position and the second position, and a position teaching unit which teaches the robot position and the position of the second tool such that first tool and the second tool pass along the work line and the distance therebetween is fixed along the work line.

BRIEF DESCRIPTION OF THE DRAWINGS

The above mentioned objects, features, and advantages and other objects, features and advantages of the present invention will become more apparent from the following detailed description of the exemplary embodiments of the present invention illustrated in the accompanying drawings in which.

DETAILED DESCRIPTION

Hereinafter, embodiments of the present invention will be described referring to the drawings. The same reference numbers for the same or corresponding constitutional elements are used over the drawings. The scale of the drawings showing the constitutional elements has appropriately been adjusted so as to facilitate the understanding of the present inventions.

Figure 1:
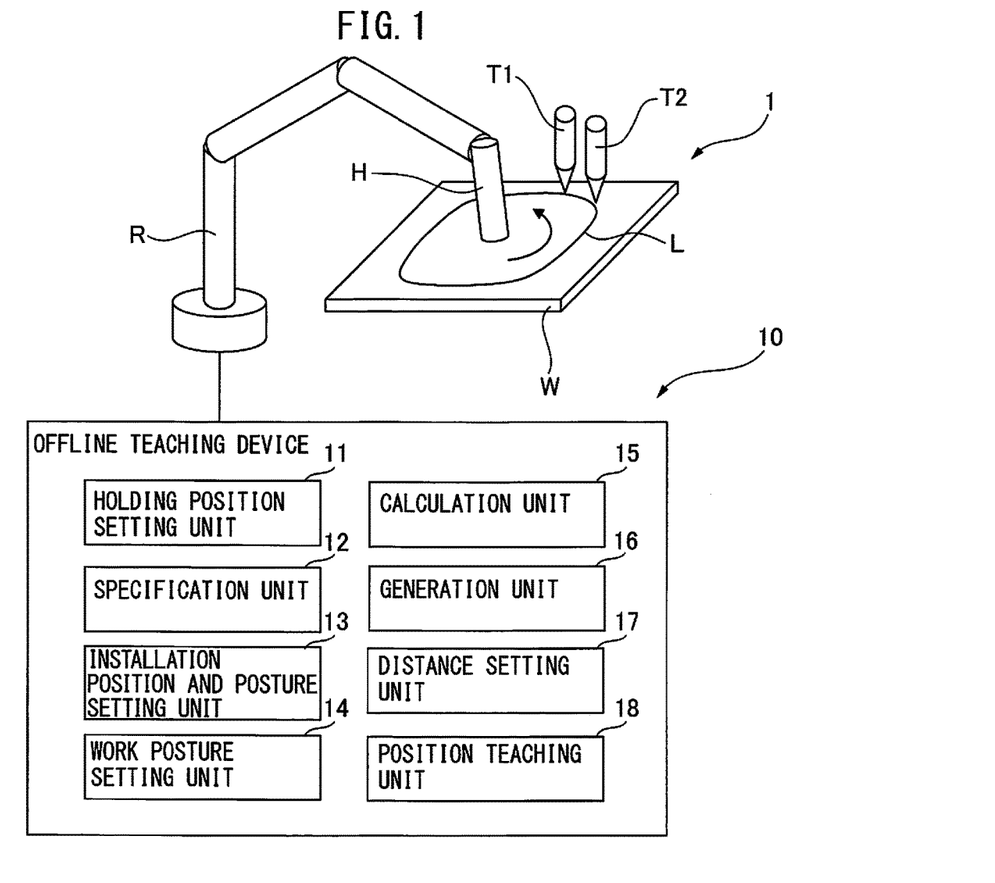
FIG. 1 is a schematic view of the system including the offline teaching device according to the first embodiment of the present invention.

FIG. 1 is a schematic view of the system including the offline teaching device according to the first embodiment of the present invention. As illustrated in FIG. 1, the system 1 mainly comprises a robot R, for example a vertically articulated robot and an offline teaching device 10 which is connected to the robot R. The offline teaching device 10 has a role as a robot control device and controls the movement of robot R.

According to the first embodiment, a hand H affixed to the tip of the robot R holds a planar workpiece W. The first tool T1 and the second tool T2 are positioned so that the surface of the workpiece W can be processed along the work line L.

Further, the work line L, for example, includes four straight line paths and four arced paths which mutually connect the straight line paths. The same is true for the other embodiments. Note that it is necessary for the work line L to include at least one arced path.

In a typical embodiment, the first tool T1 is a laser cutting tool wherein a laser is emitted from the tip thereof. In FIG. 1, it is assumed that the first tool T1 carries out cutting of the workpiece W along the work line L. The second tool T2 is a cooling tool which ejects cold water from the tip thereof. Because of this the second tool T2 tracks the first tool T1 along the work line L on which the first tool T1 carries out work. In other words, the first tool T1 is positioned before the second tool T2 in the direction of travel on the work line L.

However, the first tool T1 may be a tool which cuts the workpiece by a method other than a laser. Further, the second tool T2 may be a tool which cools the workpiece W by a method other than cold water. Alternatively, the first tool T1 and the second tool T2 may respectively be other tools.

As illustrated in FIG. 1, an offline teaching device 10 is connected to the robot R. The offline teaching device 10 comprises a holding position setting unit 11 which sets the holding position of the workpiece W held by the robot R, a specification unit 12 which specifies a work line L on which the first tool T1 will work based on CAD data of the workpiece W, an installation position and posture setting unit 13 which sets the installation position and posture of the first tool T1 and the second tool T2 and a work posture setting unit 14 which sets the work posture of the first tool T1 with respect to the workpiece W. The setting and designating operations of the holding position setting unit 11, specification unit 12, installation position and posture setting unit 13 and the work posture setting unit 14 are performed before the operations which will be described with reference to the flowchart are performed.

Further, the offline teaching device 10 comprises a calculation unit 15 which processes a variety of calculations, and a generating unit 16 which generates a robot teaching position which will be discussed later as well as a program to allow the first tool T1 and the second tool T2 to pass along the work line.

Further, the offline teaching device 10 comprises a distance setting unit 17 which sets a distance between the first tool T1 and the second tool T2 along the work line, and a position teaching unit 18 which teaches the positions of the robot and the second tool T2 so that the first tool T1 and the second tool T2 are moved along the work line and a fixed distance is maintained between the first tool T1 and the second tool T2 along the work line.

Figure 2:
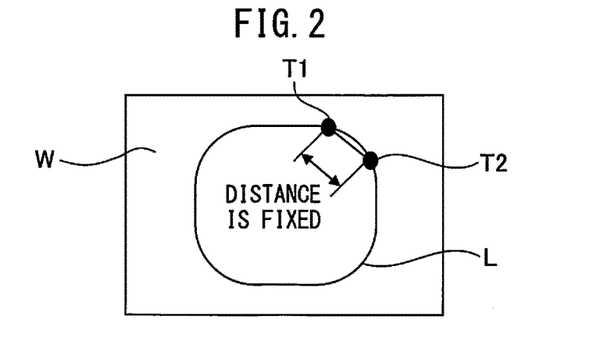
FIG. 2 is a plan view of the workpiece shown in FIG. 1

FIG. 2 is a plan view of the workpiece illustrated in FIG. 1. As illustrated in FIG. 2, the minimum distance between the first tool T1 and the second tool T2 of the first embodiment is fixed and does not change. Further, the first tool T1 and the second tool T2 pass along the same work line L.

As illustrated in FIG. 2, when the first tool T1 and the second tool T2 are positioned on an arced path portion of the work line L, a straight line joining the first tool 1 and the second tool 2 is positioned on the inside of the work line L. Further, the work line L on the workpiece W is defined by a plurality of points P1$n$ (n=1 to N, where N is a natural number and is determined corresponding to the length of the work line L) which are positioned at predetermined intervals.

Figure 3:
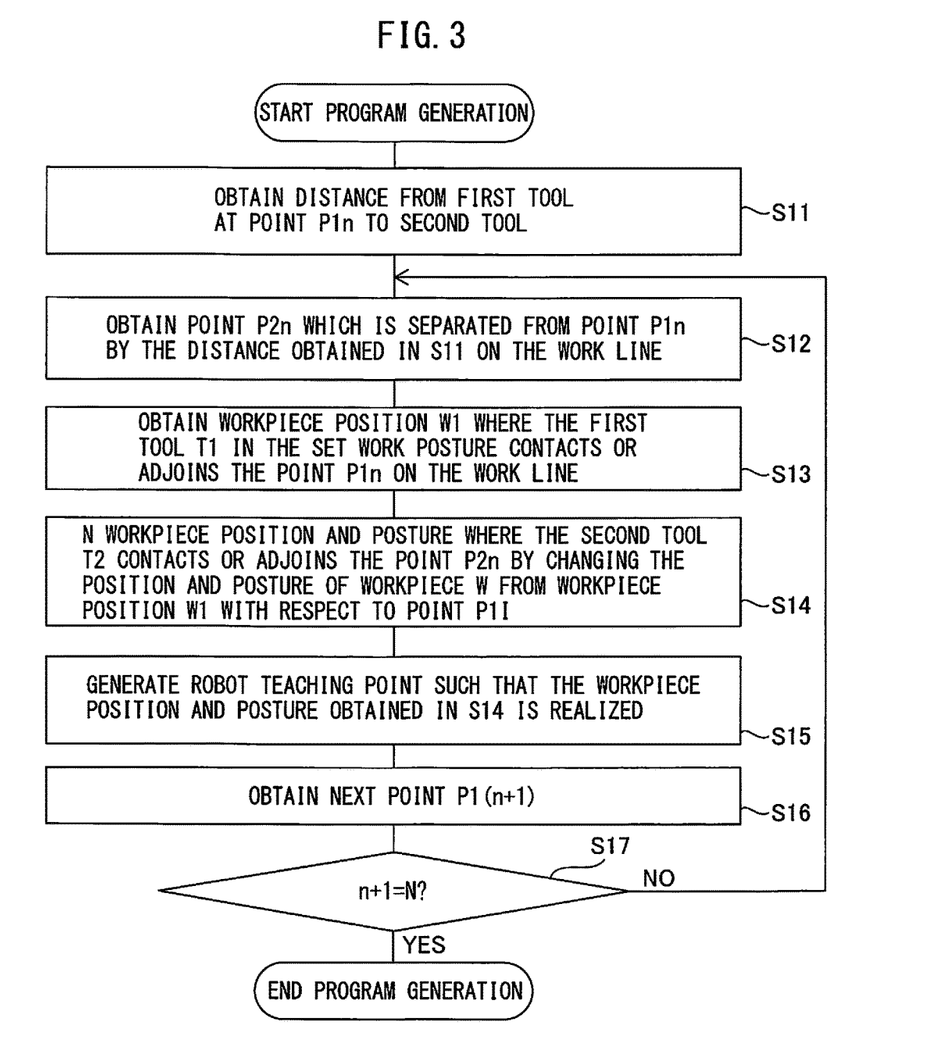
FIG. 3 is a flowchart illustrating the operation of the offline teaching device according to the first embodiment of the present invention.

FIG. 3 is a flowchart illustrating the operation of the offline teaching device according to the first embodiment of the present invention. The content illustrated in FIG. 3 is recorded in a storage unit (not illustrated) of the offline teaching unit 10. The first embodiment of the present invention will be described with reference to FIG. 3 below. Note that the position of the first tool T1 (or the second tool T2) means the position of the tip of the first tool T1 (or the second tool T2).

Firstly, in step S11, the distance to the second tool T2 from the first tool T1 positioned on the first point P11 (n=1) on the work line L is obtained. In the first embodiment this distance does not change and is fixed beforehand.

Then, in step S12, in a direction opposite the direction of movement of the first tool T1, a point P21 on the work line L which is separated from the first point P11 on the work line L by the distance determined in step S11 is obtained.

Then, in step S13, a workpiece position W1 where the first tool T1 contacts or adjoins the first point P1 on the work line L in the work posture set by the work posture setting unit 14 is obtained.

Figure 4A:
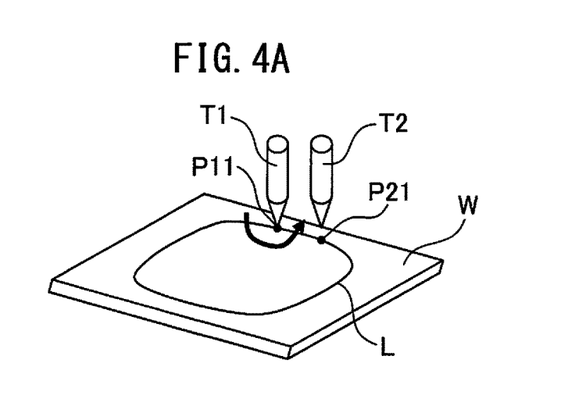
FIG. 4A is a first perspective view of the workpiece.

Herein, FIG. 4A is a first perspective view of the workpiece. As illustrated in FIG. 4A, the first tool T1 is positioned on the point P11 on the work line L, however, the second tool T2 is apart from the point P21 on the work line L. Note that in the first embodiment, the position of the workpiece illustrated in FIG. 4 is the workpiece position W1.

Figure 4B:
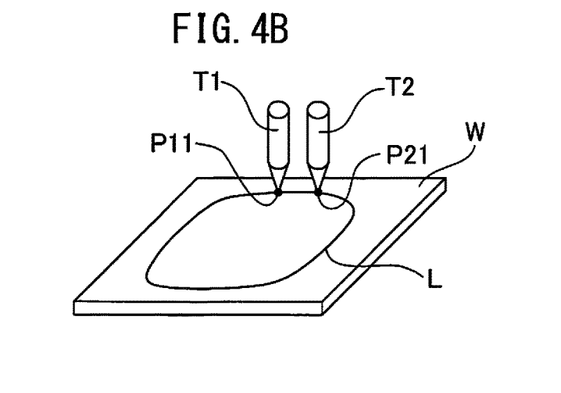
FIG. 4B is a second perspective view of the workpiece.

Referring again to FIG. 3, in step S14, the position and posture of the workpiece W is changed from the workpiece position W1 with respect to the point P11. As illustrated in FIG. 4A, when the work posture of the first tool T1 is perpendicular to the workpiece W, the workpiece W is rotated about the point P11 as shown by the arrow. Thereafter, as illustrated in FIG. 4B, the workpiece position and posture where the second tool T2 contacts or adjoins the point P21 on the work line L, is obtained. Further, in step 15, a teaching point of the robot R is generated so that the workpiece position and posture obtained in step S14 is realized.

Then, the next point P12 (n+1→n=2) on the work line L is obtained and it is determined whether the point P12 is the final point P1N on the work line L (steps S16 and S17). If the next point P12 is not the final point P1N, the processes in steps P12 to P16 are repeated. If the next point P12 is the final point P1N, it means that the program has been generated, and accordingly the operation ends.

In the first embodiment, teaching points are generated so that both the first tool T1 and the second tool T2 which are separated from one another at a fixed distance, pass along the work line which has been designated based on the CAD data. Because of this, a program according to which the first tool T1 and the second tool T2 pass along the common work line L while keeping a fixed distance from each other can be accurately generated. Additionally, in the case that the first tool T1 is a laser cutting tool and the second tool T2 is a cooling tool, cold water etc. can be accurately ejected along the trajectory of the laser cutting tool. Therefore, the machining quality of the workpiece can be improved.

Figure 5:
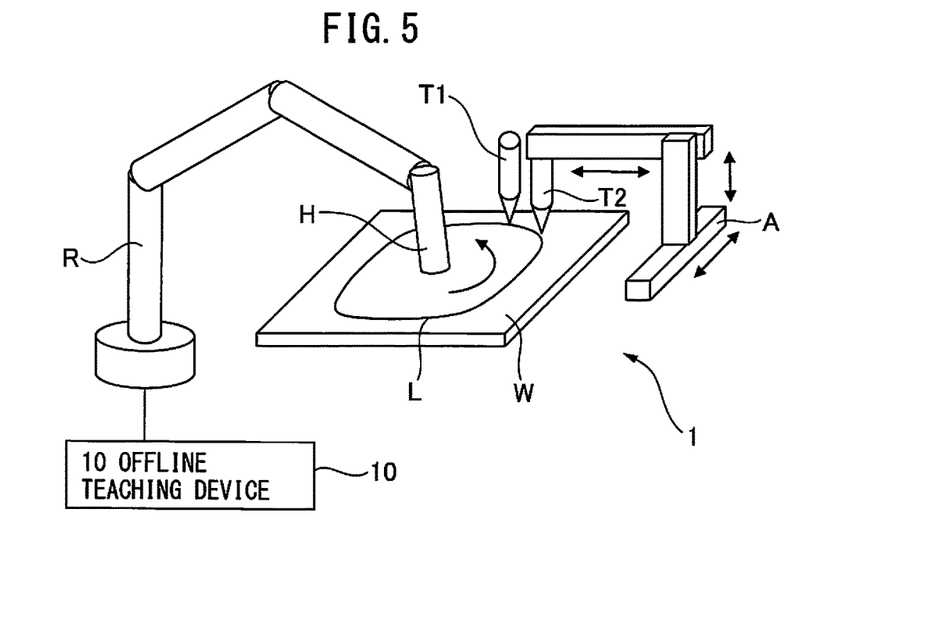
FIG. 5 is a schematic view of the system including the offline teaching device according to the second embodiment of the present invention.

FIG. 5 is a schematic view of a system comprising an offline teaching device according to the second embodiment of the present invention. For the purpose of brevity, in the second embodiment and other embodiments which will be discussed hereinafter no duplicate descriptions of the configurations of the components corresponding to those in the first embodiment will be given.

In the second embodiment, the hand H which is fixed to the tip of the robot R, holds a planar workpiece W. Then the first tool T1 and the second tool T2 machine the surface of the workpiece along the work line L.

As illustrated in FIG. 5, the first tool T1 is disposed at a predetermined position in the second embodiment. Further, the second tool T2 is affixed to the tip of an XYZ table "A". Because of this, the second tool T2 can be moved in the XYZ directions with respect to the first tool T1 so that the second tool 2 can be positioned in a desired position. Note that, instead of the XYZ table "A", the second tool T2 may be moved by another robot which is not illustrated.

Figure 6:
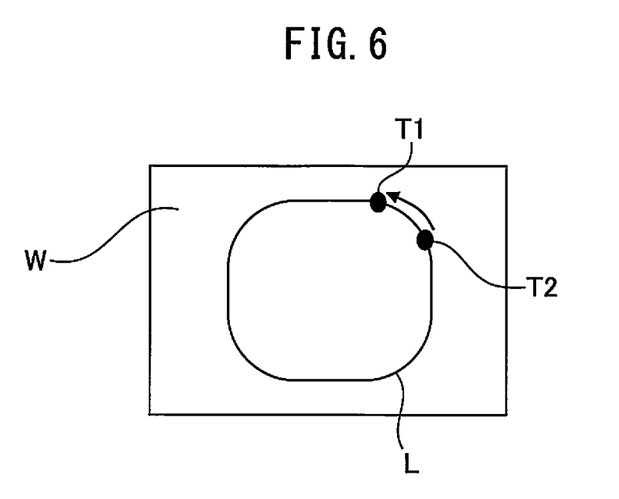
FIG. 6 is a plan view of the workpiece illustrated in FIG. 5.

FIG. 6 is a plan view of the workpiece illustrated in FIG. 5. As illustrated in FIG. 6, in the second embodiment, the distance between the first tool T1 and the second tool T2 along the work line L is fixed. This distance can be set by using the table XYZ "A". Note that both the first tool T1 and the second tool T2 pass along the same work line L.

Figure 7:
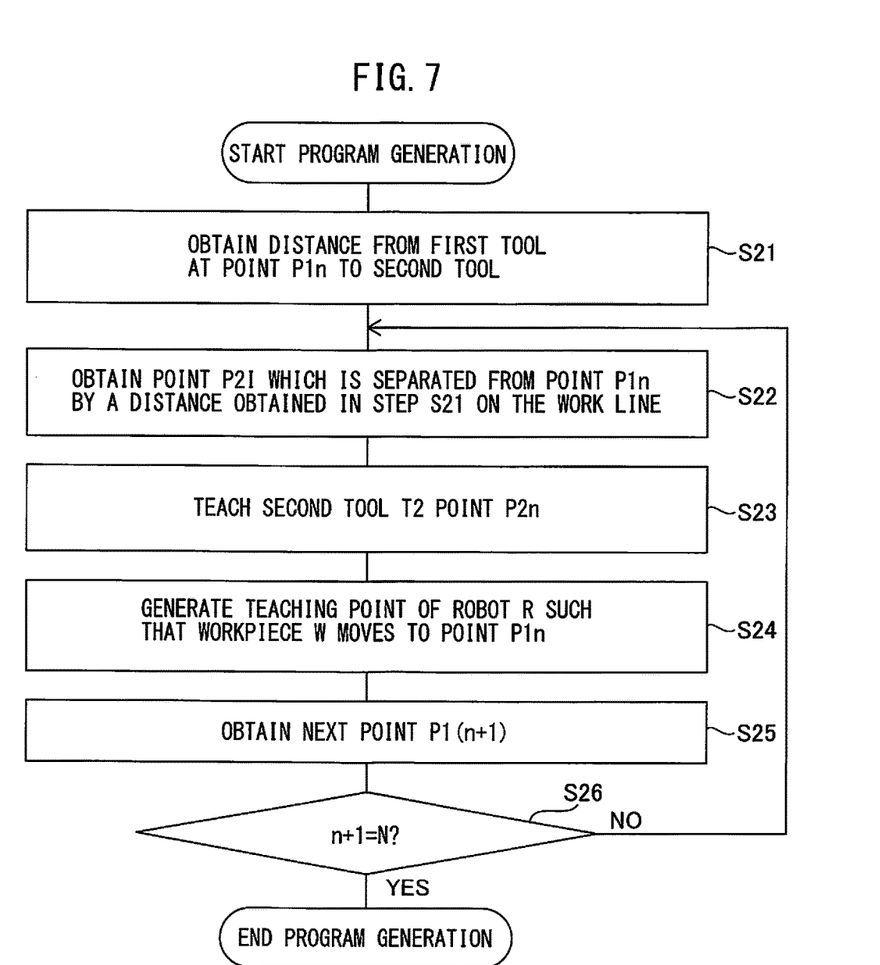
FIG. 7 is a flowchart illustrating the operation of the offline teaching device according to the second embodiment of the present invention.

FIG. 7 is a flowchart illustrating the operation of the offline teaching device according to the second embodiment of the present invention. The content illustrated in FIG. 7 is recorded in the storage unit (not illustrated) of the offline teaching device 10. The second embodiment of the present invention will be described below with reference to FIG. 7.

Firstly, in step S21, the distance from the first tool T1 positioned on the first point P11 (n=1) on the work line L to the second tool T2 is obtained. In the second embodiment, when the distance between the first tool T1 and the second tool T2 are set by the distance setting unit 17, the XYZ table "A" positions the second tool T2 at a position spaced by this distance from the first tool T1. Therefore, in step S21, the distance set by the distance setting unit 17 is obtained.

Then, in step S22, in a direction opposite the direction of movement of the first tool T1, the point P21 on the work line L which is separated from the first point P11 on the work line L by the distance determined in step S21 is obtained.

Then, in step S23, the position teaching unit 18 teaches the point P21 as the position for the second tool T2. Then, in step S24, the position teaching unit 18 generates a teaching point for the robot R so that the workpiece W moves to the point P11.

Then, the next point P12 (n+1→n=2) on the line L is obtained. It is determined whether the point P12 on the work line L is the final point PIN or not (steps S25 and S26). If the point P12 is not the final point P1N, the operations in steps S22 to S25 are repeated. If the next point P12 is the final point P1N, it means that the program has been generated and the operation ends.

In the second embodiment, in the state in which the second tool T2 is moveable with respect to the first tool T1, the teaching position of the robot R and the teaching point of the second tool T2 are generated so that the distance along the work line between the first tool T1 and the second tool T2 is a fixed distance. Because of this, an accurate program can be generated so that the first tool T1 and the second tool T2 move along the same work line with a fixed distance therebetween. Further, if the first tool T1 is a laser cutting tool and the second tool T2 is a cooling tool, the time taken to cool the workpiece W after the workpiece has been cut can be maintained at a fixed level. Therefore the processing quality of the workpiece can be maintained at a fixed level.

Figure 8:
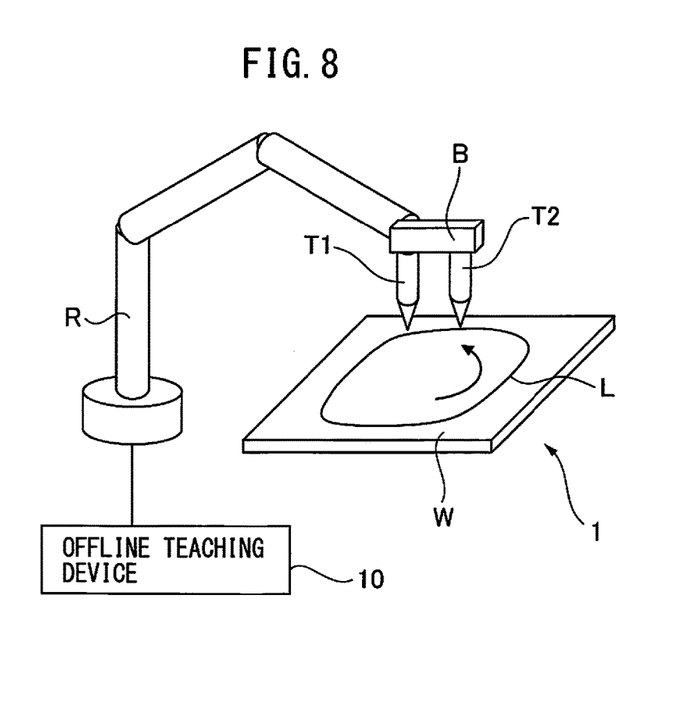
FIG. 8 is a schematic view of the system including the offline teaching device according to the third embodiment of the present invention.

FIG. 8 is a schematic view of a system comprising an offline teaching device according to the third embodiment of the present invention. In the third embodiment, a first tool T1 and a second tool T2 are affixed to a base B attached to the tip of the robot R and the workpiece W is disposed at a predetermined position. In the third embodiment the first tool T1 and the second tool T2 process the surface of the workpiece W along the work line L. As in the first embodiment with reference to FIG. 2, the minimum distance between the first tool T1 and the second tool T2 is fixed and does not change.

Figure 9:
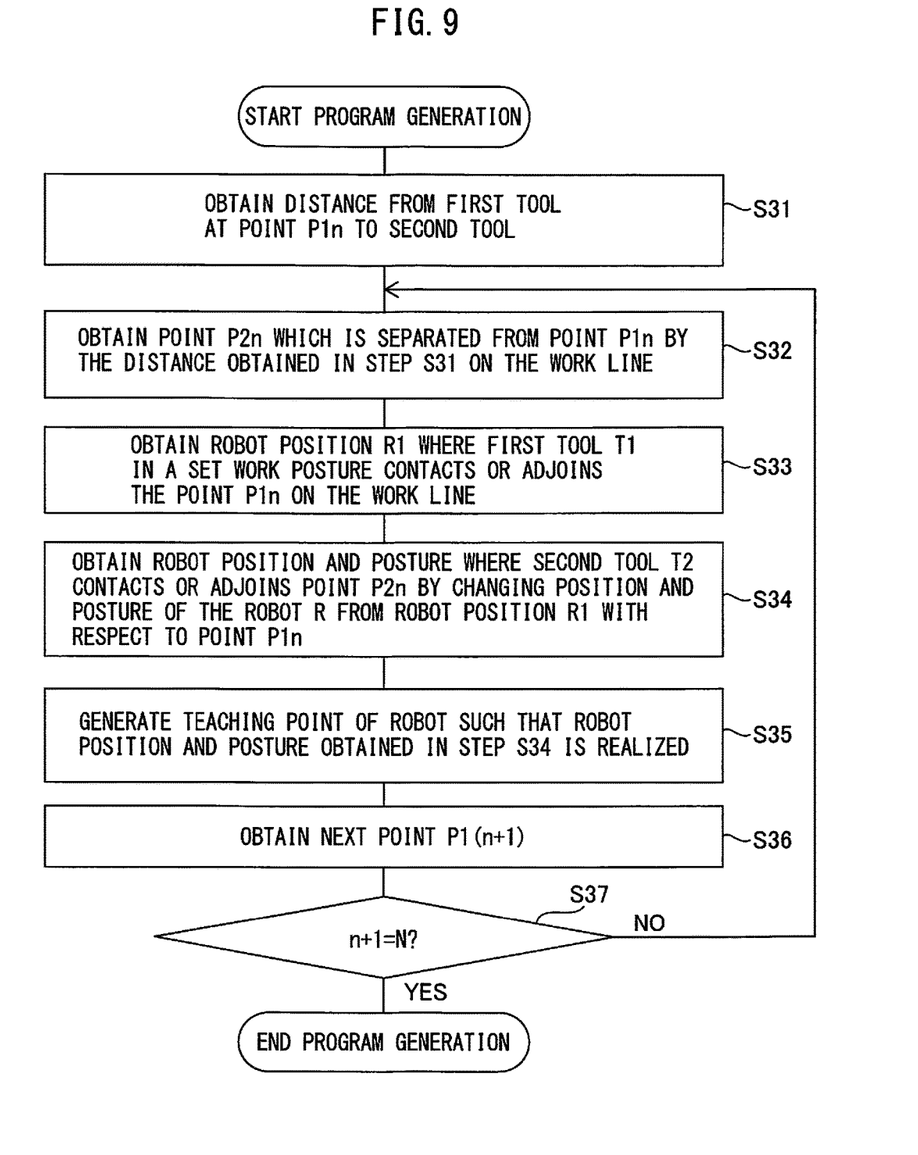
FIG. 9 is a flowchart illustrating the operation of the offline teaching device according to the third embodiment of the present invention.

FIG. 9 is a flowchart which illustrates the operation of the offline teaching device according to the third embodiment of the present invention. The content illustrated in FIG. 9 is recorded in the storage unit (not illustrated) of the offline teaching unit 10. The third embodiment is described below with reference to FIG. 9.

Firstly, in step S31, the distance to tool T2 from the tool T1 which is positioned at the first point P11 (n=1) on the work line L is obtained. In the third embodiment this distance is constant and is predetermined.

Then in step S32, in a direction opposite the direction of movement of the first tool T1, the point P21 on the work line L, which is spaced from the first point P11 on the work line L by a distance determined in step S31, is obtained.

Then, in step S33, a robot position R1 is obtained where the first tool T1 contacts or adjoins the first point P1 on the work line L in the work posture set by the work posture setting unit 14. In the third embodiment, the position shown in FIG. 4A corresponds to the robot position R1.

In step S34, the position and the posture of the robot R is changed from the robot position R1 with respect to the point P11. As illustrated in FIG. 4A, when the work posture of the first tool T1 is perpendicular to the workpiece W, the robot R is rotated about the point P11 as indicated by the arrow. Further, as indicated in FIG. 4B, a robot position and posture where the second tool T2 contacts or adjoins the point P21 on the work line L, is obtained. Further, in step S35, a teaching point for robot R is generated so that the robot position and posture determined in step S34 are obtained.

Then, the next point P12 (n+1→n=2) on the work line L is obtained, and it is determined whether the point P12 is the last point PIN on the work line L or not (steps S36 and S37). If the next point P12 is not the final point P1N, the operations in steps S32 to S36 are repeated. If the next point P12 is the final point P1N, the control ends as a program has been generated.

In the third embodiment, teaching points are generated so that both the first tool T1 and the second tool T2 which are disposed at a fixed distance from each other pass along the work line specified based on the CAD data. Therefore, an accurate program can be generated where the first tool T1 and the second tool T2 pass along the same work line L at a fixed distance from each other. Thus, if the first tool T1 is a laser cutting tool and the second tool T2 is a cooling tool, cold water can be accurately ejected along the trajectory of the laser cutting tool. Therefore, the processing quality of the workpiece can be improved.

Figure 10:
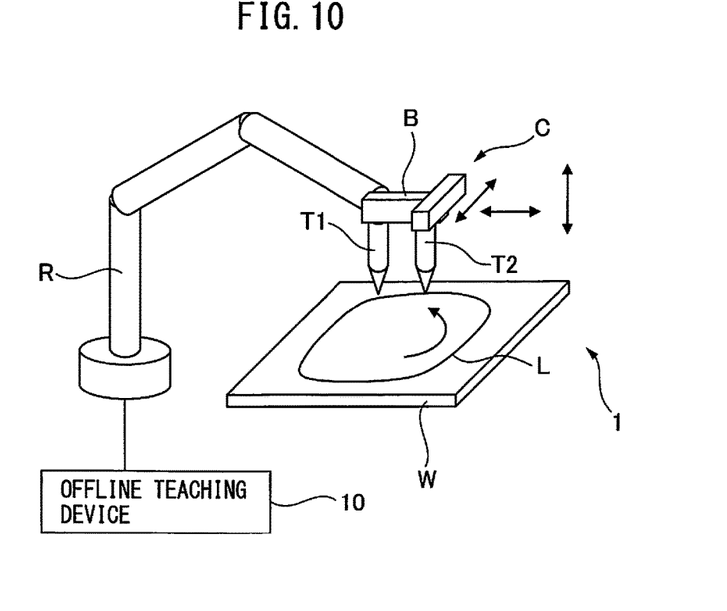
FIG. 10 is a schematic view of the system including the offline teaching device according to the fourth embodiment of the present invention.

FIG. 10 is a schematic view of the system comprising the offline teaching device according to the fourth embodiment of the present invention. In the fourth embodiment, the first tool T1 is affixed to an end of a base B which is affixed to the tip of the robot R. The XYZ table C is affixed to the other end of the base B. The tool T2 is affixed to the tip of the XYZ table C. Therefore, the second tool 2 is movable in the XYZ directions with respect to the first tool T1 so that the second tool T2 can be positioned in a desired position. Note that instead of the XYZ table C, the second tool T2 may be moved by another robot which is not illustrated.

Further, the workpiece W is held at a predetermined position. In the fourth embodiment, the first tool T1 and the second tool T2 perform processing of the workpiece W on the surface thereof along the work line L.

Figure 11:
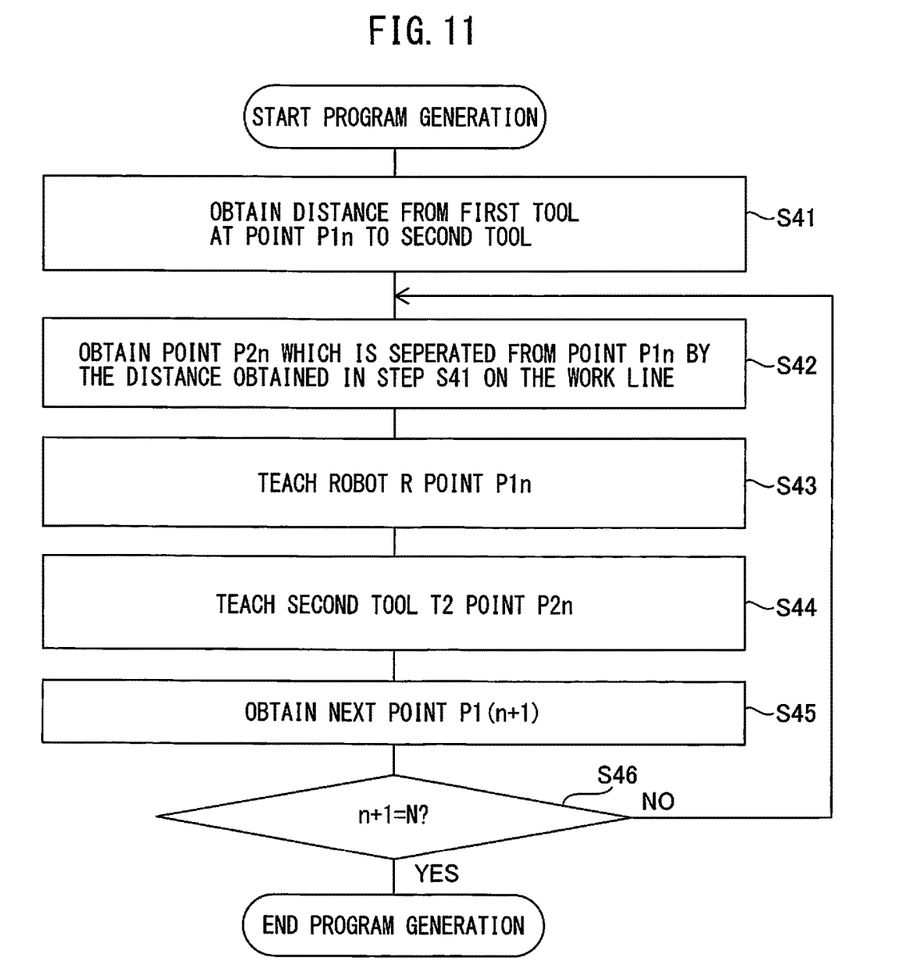
FIG. 11 is a flowchart illustrating the operation of the offline teaching device according to the fourth embodiment of the present invention.

FIG. 11 is a flowchart which illustrates the operation of the offline teaching device according to the fourth embodiment of the present invention. The content illustrated in FIG. 11 is recorded in the storage unit (not illustrated) of the offline teaching device 10. The fourth embodiment of the present invention will be described below with reference to FIG. 11.

Firstly, in step S41, the distance to the second tool T2 from the first tool T1 positioned on the first point P11 (n=1) on the work line L is obtained. In the fourth embodiment, when the distance setting unit 17 sets the distance between the first tool T1 and the second tool T2, the XYZ table C moves the second tool T2 to a position spaced away from tool T1 by this distance. Therefore, in step S41, the distance set by the distance setting unit 17 may be obtained.

Then, in step S42, the point P21 which is spaced from the first point P11 on the work line L by the distance established in the step S41 in a direction opposite the direction of movement of the first tool T1 is determined.

Then, in step 43, the position teaching unit 18 generates a teaching point of robot R such that the robot R moves to the point P11. Then, in step 44, the position teaching unit 18 teaches the position P21 as the position of the second tool T2.

Then, the next point P12 (n+1→n=2) on the work line L is obtained, and it is determined whether the point P12 is the final point P1N on the work line L or not (step S45 and step S46). If the next point P12 is not the final point P1N, the operations in steps 42 to 45 are repeated. If the point P12 is the final point P1N, processing is stopped as the program has been generated.

In the fourth embodiment, the teaching position of the robot R and the teaching position of the second tool T2 are generated such that the distance between the first tool T1 and the second tool T2 along the work line is kept constant in the state that the second tool T2 is moveable with respect to the first tool T1. Because of this, an accurate program according to which the tool T1 and the tool T2 pass along the same work line while maintaining a fixed distance therebetween, can be generated. Furthermore, if the first tool T1 is a laser cutting tool and the second tool T2 is a cooling tool, the time taken for the workpiece W to be cooled after being cut is kept constant. Therefore the processing quality of the workpiece W can be kept constant.

Advantageous Effects of the Invention

According to the first and third embodiments, teaching points are generated such that both the first tool T1 and the second tool T2 which are spaced from one another at a fixed distance pass along the work line designated from the CAD data. Because of this, an accurate program can be generated for the tool T1 and the tool T2 to pass along the same work line while maintaining a fixed distance therebetween. Thus, if the first tool T1 is a laser cutting tool and the second tool T2 is a cooling tool, cold water can be accurately ejected along the trajectory of the laser cutting tool. Therefore the processing quality of the workpiece can be improved.

In the second and fourth embodiments, the second tool is moveable with respect to the first tool, thus the teaching position of the robot and the teaching position of the second tool can be generated such that the distance between the first tool and the second tool along the work line is constant. Because of this, an accurate program can be generated for the tool T1 and the tool T2 to pass along the same work line while maintaining a fixed distance therebetween. Thus, if the first tool is a laser cutting tool and the second tool is a cooling tool, the time taken for the workpiece to be cooled after being cut is kept constant. Therefore the processing quality of the workpiece can be kept constant.

Typical embodiments of the present invention have been described; however, it should be obvious to a person skilled in the art that without departing from the scope of the present invention, the aforementioned changes and various other changes, omissions and additions can be carried out.

The invention claimed is:

1. An offline teaching device wherein a workpiece held by a robot is brought into contact with or is moved close to a first tool disposed at a predetermined position and a second tool separated by a predetermined distance from the first tool, to carry out work, said offline teaching device comprising:

a robot control device configured to
set a holding position of the workpiece held by the robot,
specify a work line on which the first tool carries out work according to CAD data of the workpiece,
set an installation position and posture of the first and second tools,
set a work posture of the first tool with respect to the workpiece,
calculate a second position for the second tool on the work line, which is a position separated by the predetermined distance from a first position of the first tool on the work line,
calculate a workpiece position where the first tool in the first position contacts or adjoins the workpiece,
calculate a workpiece position and posture such that the second tool in the second position contacts or adjoins the workpiece by changing a position of the workpiece with respect to the first tool, while maintaining the work posture of the first tool,
generate a robot teaching position based on the calculated workpiece position and posture and the set holding position of the workpiece,
generate a program according to which the first tool and the second tool pass along the work line, wherein the work line includes a straight section and a curved section, and
move the first and second tools to pass along the work line according to the generated program while maintaining the distance between the first tool and the second tool along the straight section of the work line to be the same as the distance between the first tool and the second tool along the curved section of the work line.

2. The offline teaching device of claim 1, wherein, in said changing the position of the workpiece with respect to the first tool, the workpiece is rotated about the first position where the first tool contacts or adjoins the workpiece.

3. An offline teaching device wherein a workpiece held by a robot is brought into contact with or is moved close to a first tool disposed at a predetermined position and a second tool which is three dimensionally moveable with respect to the first tool, to carry out work, said offline teaching device comprising:

a robot control device configured to
set a holding position of the workpiece held by the robot,
specify a work line on which the first tool carries out work according to CAD data of the workpiece,
set an installation position and posture of the first and second tools,
set a work posture of the first tool with respect to the workpiece,
set a distance between the first tool and the second tool along the work line,
calculate a second position for the second tool on the workpiece positioned on the work line separated by the set distance from a first position on the workpiece on which the first tool will carry out work on the work line,
calculate a workpiece position where the first tool, which is in a work posture in the first position on the work line, contacts or adjoins the workpiece,
calculate a robot position based on the workpiece position and the set holding position of the workpiece for moving the workpiece by the robot to the workpiece position, calculate a position of the second tool based on the workpiece position and the second position, teach the robot position and the position of the second tool, move the first tool and the second tool to pass along the work line according to the taught robot position and the taught position of the second tool while maintaining the distance between the first and second tools along the work line to be fixed, wherein the work line includes a straight section and a curved section, and the robot control device is configured to maintain the distance between the first tool and the second tool along the straight section of the work line to be fixed and to be the same as the distance between the first tool and the second tool along the curved section of the work line.

4. The offline teaching device of claim 3, wherein the robot control device is configured to cause the second tool, which is affixed to a tip of an XYZ table, to move by the XYZ table with respect to the first tool in three directions mutually perpendicular to each other.

5. An offline teaching device comprising a robot to whose tip are affixed a first tool and a second tool, wherein the second tool is separated by a predetermined distance from the first tool, and wherein the robot carries out work on a workpiece disposed in a predetermined position while moving the first tool and the second tool, said offline teaching device comprising:

a robot control device configured to specify a work line on which the first tool carries out work according to CAD data of the workpiece, set an installation position and posture of the first and second tools, set a work posture of the first tool with respect to the workpiece, calculate a second position for the second tool on the work line which is separated by the predetermined distance from a first position of the first tool on the work line, calculate a robot position where the first tool in the first position contacts or adjoins the workpiece, and generate a robot position and posture as a robot teaching point when the second tool in the second position contacts or adjoins the workpiece by rotating the robot about the first position where the first tool contacts or adjoins the workpiece for changing the posture of the robot from the robot position with respect to the first tool, while maintaining the work posture of the first tool, generate a program according to the generated robot position and posture, and move the first and second tools to pass along the work line according to the generated program.

6. An offline teaching device comprising a robot to whose tip are affixed a first tool and a second tool, wherein the second tool is three dimensionally movable with respect to the first tool, and wherein the robot carries out work on a workpiece disposed in a predetermined position while moving the first tool and the second tool, said offline teaching device comprising:

a robot control device configured to specify a work line on which the first tool works according to CAD data of the workpiece, set an installation position and posture of the first and second tools, set a work posture of the first tool with respect to the workpiece, set a distance between the first tool and the second tool along the work line, calculate a second position for the second tool on the workpiece, which is separated by the set distance, from a first position on the workpiece on which the first tool will carry out work on the work line, calculate a robot position where the first tool in the work posture contacts or adjoins the workpiece at a first position, calculate a position of the second tool based on the robot position and the second position, teach the robot position and the position of the second tool, and move first tool and the second tool to pass along the work line according to the taught robot position and the taught position of the second tool while maintaining the distance between the first and second tools to be is fixed along the work line, wherein the robot control device is configured to control an XYZ table attached to the tip of the robot, and cause the second tool, which is affixed to a tip of the XYZ table, to move by the XYZ table with respect to the first tool in three directions mutually perpendicular to each other.

* * * * *